April 29, 1924.

H. W. CLARK

METER TESTER

Filed Nov. 20, 1918      4 Sheets-Sheet 2

1,492,204

Witness:
John Enders

Inventor:
Horace W. Clark
by Fred Gulach
his Atty.

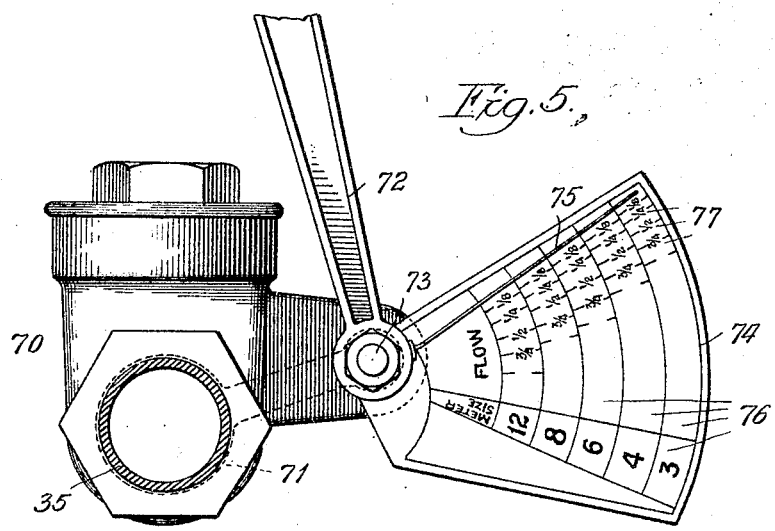
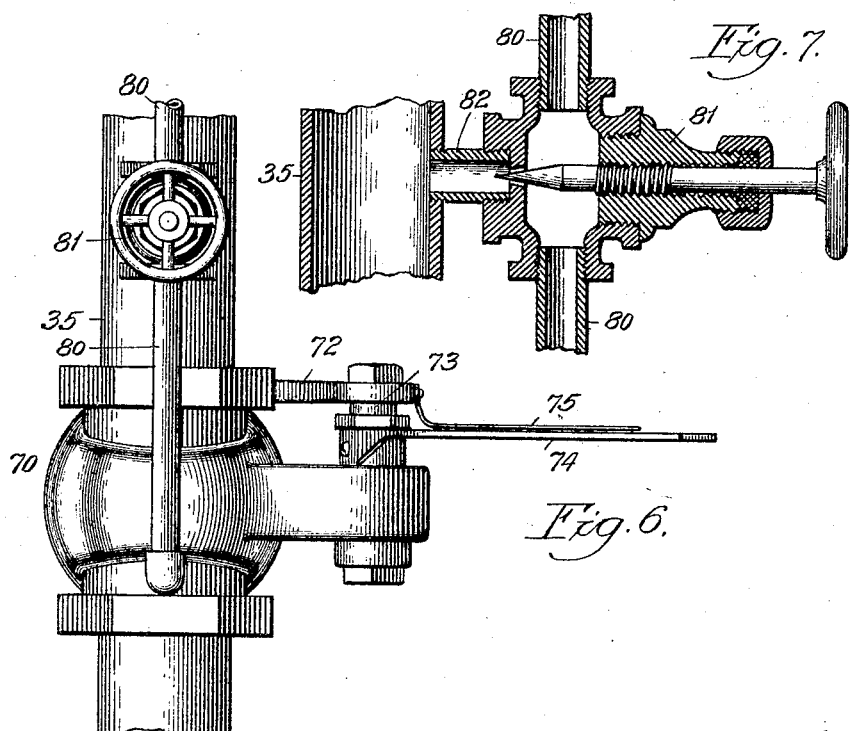

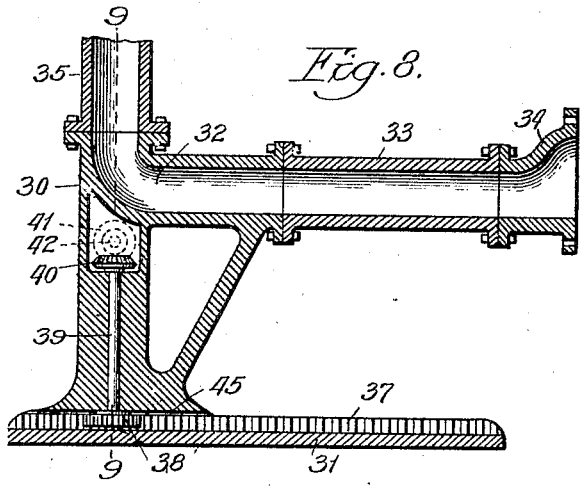
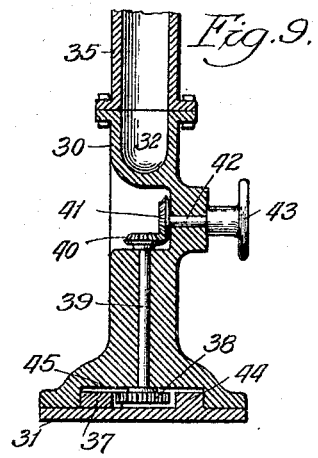
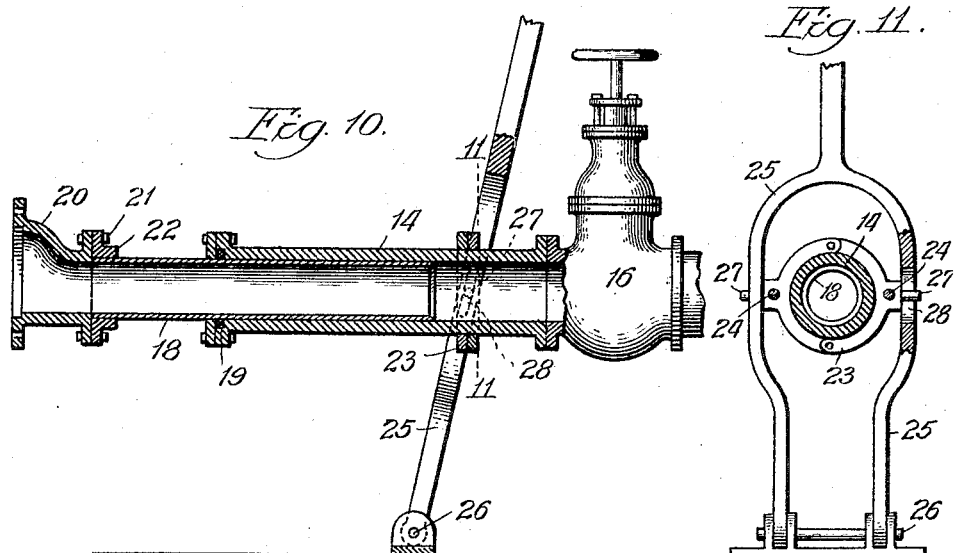
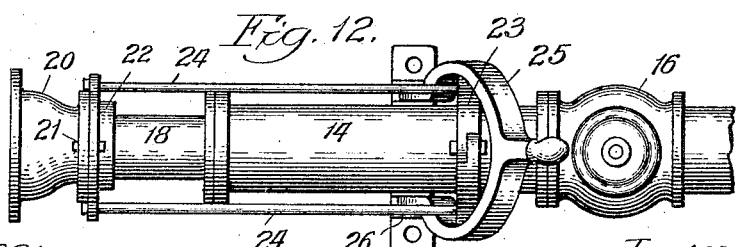

Patented Apr. 29, 1924.

1,492,204

UNITED STATES PATENT OFFICE.

HORACE W. CLARK, OF MATTOON, ILLINOIS.

METER TESTER.

Application filed November 20, 1918. Serial No. 263,270.

*To all whom it may concern:*

Be it known that I, HORACE W. CLARK, a citizen of the United States, and a resident of Mattoon, in the county of Coles and State of Illinois, have invented certain new and useful Improvements in Meter Testers, of which the following is a full, clear, and exact description.

The invention relates to testers for fluid meters.

One object of the invention is to provide a tester with improved mechanism for making fractional flow tests and which is adapted for different sizes of meters, so that one tester may be used for fractional flow tests of meters of different sizes.

A further object of the invention is to provide improved devices for making sensibility tests of the meter.

A further object of the invention is to provide improved means for delivering and holding meters in position for speedy connection to and disconnection from the inlet and discharge connections of the tester, and more particularly adapted for large meters.

A still further object of the invention is to provide improved means for adjusting the connections for the meter.

Further objects of the invention will appear from the detailed description.

The invention consists in the several novel features hereinafter set forth and more particularly defined by the claim at the conclusion hereof.

Figure 1:
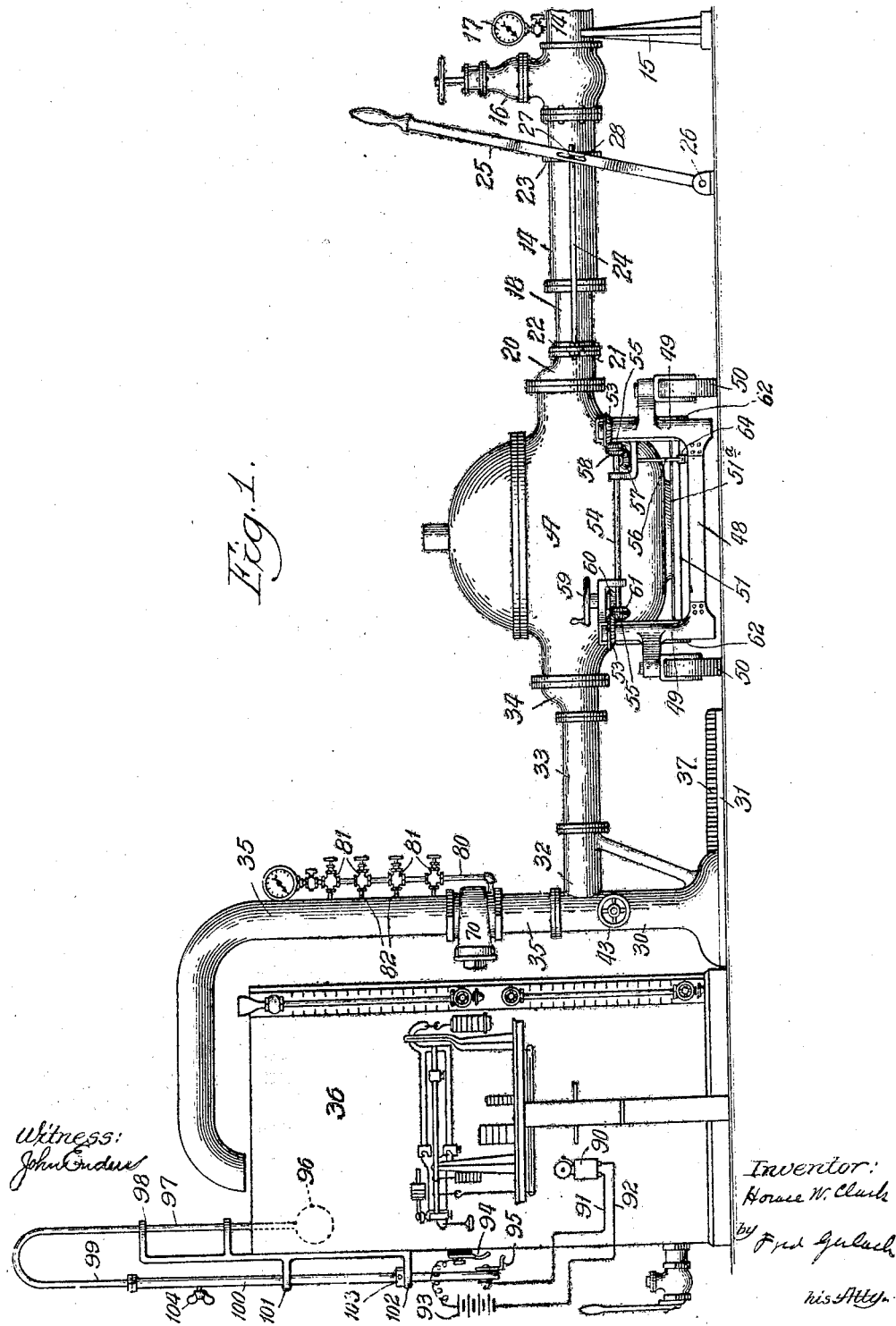
Figure 2:
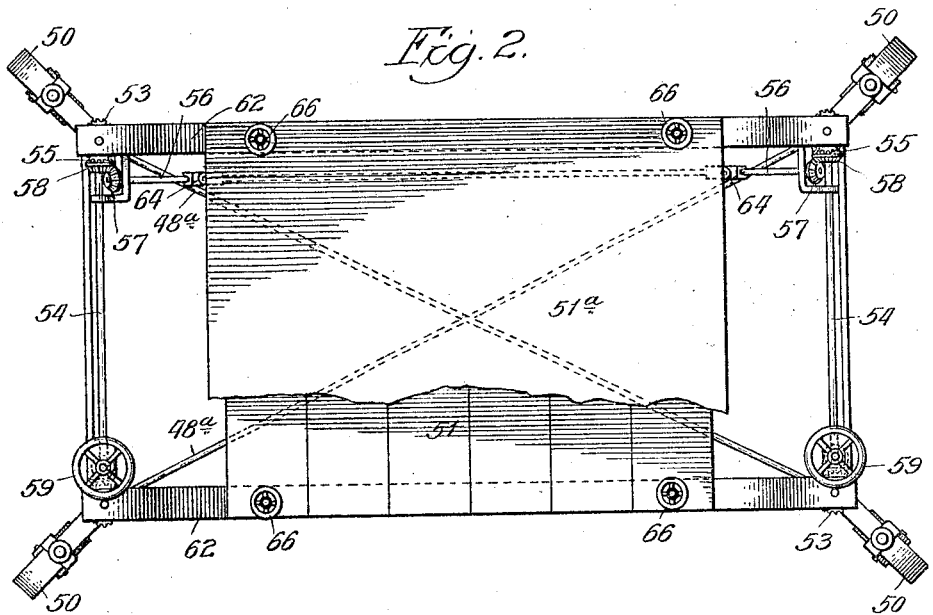
Figure 3:
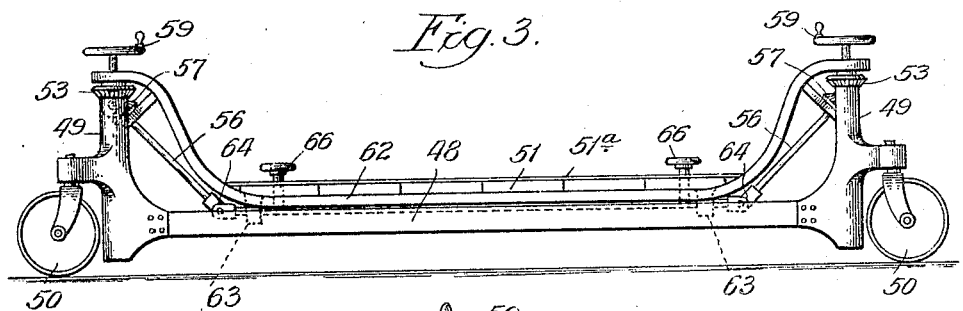
Figure 4:
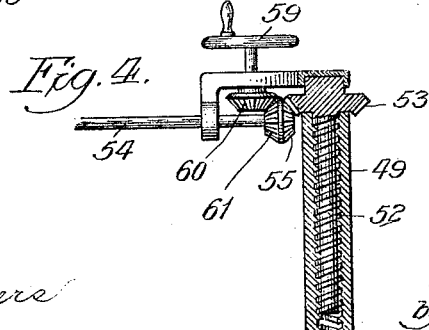

In the drawings: Fig. 1 is a side elevation of a tester embodying the invention. Fig. 2 is a plan of the meter truck. Fig. 3 is a side elevation of the same. Fig. 4 is a detailed section showing the gearing for vertically adjusting the meter-platform on the truck. Fig. 5 is a plan of the improved fractional flow valve. Fig. 6 is a side elevation of the same. Fig. 7 is a section through one of the sensibility-test valves. Fig. 8 is a vertical longitudinal section of the discharge connection. Fig. 9 is a section taken on line 9—9 of Fig. 8. Fig. 10 is a section showing the inlet connection for the meter. Fig. 11 is a section taken on line 11—11 of Fig. 10. Fig. 12 is a plan of the part shown in Fig. 10.

The improved tester comprises an inlet pipe 14 mounted upon a bracket 15 which may be secured to the floor or any suitable base. A suitable valve 16 is included in the inlet pipe 14 to control the flow of water to the tester. A pressure-gauge 17 is connected to the inlet pipe to indicate the pressure of the fluid therein. A pipe section 18 is slidably mounted in the inner end of the inlet-pipe 14 so that it may be adjusted into and out of connected relation with the inlet connection of a water-meter A. Packing 19 is provided at the inner end of the pipe 14 to prevent the escape of fluid around pipe 18. An adapter 20 is removably secured to a collar 22 fixed on the inner end of pipe-section 18 by bolts 21. This adapter is flanged so it can be secured to the inlet spud of the meter, by bolts. Different sizes of adapters may be secured to pipe 18 by bolts 21 to provide suitable connections with the inlets of meters of different sizes. A collar 23 formed of sections so it can be placed around pipe 14 is slidable on the outside of said pipe and is connected to the inner end of said pipe by rods 24. A bifurcated lever 25 pivoted to a lug secured to the floor, as at 26, is provided for shifting pipe 18 and the adapter 20 and is connected to collar 23 by studs 27 on the collar which are extended into slots 28 in the lever. This lever may be quickly manipulated to shift pipe 18 and adapter 20 into position to be connected to the meter or to withdraw them away from the meter when the meter has been tested.

The discharge-connection comprises a column 30 which is slidably mounted on a plate 31 for adjustment to and from the meter and the range of movement provided for is sufficient to adapt the tester for connection to meters of many different sizes. This column has an elbow-duct 32 therein to which a pipe section 33 is removably secured. An adapter 34 is bolted to the inner end of pipe 33 and is suitably flanged so that it can be bolted to the discharge connection of the meter A. A vertical pipe 35 is connected to the column 30 and the upper end of this pipe extends laterally and thence downwardly to discharge fluid into a suitable tank 36 wherein the fluid may be weighed or measured. The mechanism for shifting the discharge connection comprises a rack 37 secured to plate 31, a pinion 38 meshing with said rack and fixed to a vertical shaft 39 which is journalled in the column 30, and a bevelled gear 40 fixed to the upper end of shaft 39 and meshing with a bevelled pinion 41 which is fixed to a short horizontal shaft 42 which is journalled in the column and has a hand-wheel 43 secured thereto. By turning the hand wheel 43, the column and its connections may be quickly and bodily shifted to move the adapter 34 into or out of position for connection to the meter. Plate 31 is formed with a guide rib 44 which, together with rack 37, extends into a groove 45 in the bottom of the column 30 to truly guide the column and its connections longitudinally. Pipe-section 33 between the duct 32 and adapter 34 may be removed in event a meter of unusually large size is to be tested, being removably secured to the adapter and to the column by flanges and bolts.

The improved tester is designed for making tests of large sized meters many of which are so heavy and cumbersome that they can be handled only with difficulty and to provide for handling these meters with facility, a suitable truck is provided on which the meter to be tested is placed, so that the meter can be readily shifted into position for connection to the inlet and outlet connections. This truck comprises a rectangular frame 48 with corner standards 49 sustained by caster wheels 50, diagonal braces 48ª and a meter platform 51 which is adjustably mounted on the truck-frame. A column 52 is mounted in each standard 49 being screw-threaded thereto so that rotation of the column will raise or lower the column. A bevelled gear 53 is secured at the upper end of each screw-column 52. All of the gears 53 are connected for conjoint operation to bodily raise or lower the platform 51 by suitable gearing comprising cross shafts 54, each of which is provided with a gear 55 for engaging one of the gears 53 and a longitudinal shaft 56 provided at each end with a gear 57 for meshing with gears 58 on shafts 54. This gearing is operable by either of two hand wheels or cranks 59 which are connected to pinions 60 respectively, which mesh with pinions 61 on the cross-shafts respectively. Two of these hand wheels are provided so that the platform may be adjusted whilst the operator is at either end. Platform 51 comprises a plate 51ª of sheet metal which is mounted upon sills 62 which have their ends extended upwardly and over and bearing upon the upper ends of the screw-columns 52 so that when the latter are adjusted the platform sills will be raised or lowered. Bearings 63 are provided on sills 62 for the cross shafts 54 and shaft 56. The latter shaft is formed of sections connected by universal joints 64 so that the main portion of the shaft will be disposed under the platform and will leave the sides of the platform free and unobstructed. In some instances, the meter does not set truly on the platform or the floor is not level and to permit the meter on the platform to be accurately adjusted so that the spuds thereon will be aligned with the inlet and outlet connections of the tester, adjusting screws 66 are provided. These screws are threaded to the platform sills 62 and bear on the side-bars of the frame 48. By individual adjustment of these screws, the meter may be adjusted into true alignment for connection to the tester connections. By the use of the wheeled adjustable truck, one man can shift large meters into position and make the connections in a very short space of time. The truck is of exceptional advantage in handling the larger sizes of meters which heretofore have been handled with difficulty.

A valve 70 is included in the discharge pipe 35. This valve comprises a plate 71 which is movable across a seat on the inlet side of the valve casing and a lever 72 on the outside of the valve-casing is secured to the stem 73 of the valve, so that the valve plate may be opened to any desired extent. Associated with the lever 72 is an indicator-plate 74. A pointer 75 is secured to the lever 72 and operated thereby according to the position of the valve plate 71. Indicator plate 74 has a series of tables 76 thereon for the different sizes of meters for which the tester is adapted. Each of these tables 76 comprises a series of fractional indications 77 to indicate the fractional flow for a meter of the size for which the table is calculated. As a result of providing a valve of this type and this indicator, fractional flow tests of different sizes of meters may be made with a single valve and this is found to be an important and convenient advantage in meter-testing.

A branch-pipe 80 is connected to the discharge pipe 35 and a series of needle-point valves 81 of graduated or different sizes are included in said branch. Valves 81 control the flow of fluid through the discharge pipe or nipples 82 respectively which discharge into the column 35. These needle valves are employed to make sensibility tests and in practice it has been found to be more efficient and accurate to employ a series of these needle valves, each permitting a small fixed rate of flow, in lieu of a multiple valve, because the flow of fluid cleans the needle point every time a valve is opened and because of the accuracy of flow controlled by needle-point regulation. It will be understood that these needle valves permit a flow corresponding to different sizes of openings for which sensibility tests are desired and that any desired number may be provided.

The operation of the improved tester will be as follows: When a meter is to be tested, the truck can be wheeled to a point where the meter is located, where the meter will be placed upon the platform of the truck. The latter can be readily wheeled into position between the inlet and discharge connections to bring the spuds on the meter into position for alignment with said connections. By manipulating either of the hand wheels 59 of the truck, meters of different sizes may be elevated bodily to bring them into position for connection to the tester. If a meter does not rest truly on the platform of the truck or the floor is not true, the meter may be adjusted into true position for connection to the tester by the manipulation of one or more of the screws 66. Lever 25 may be shifted into position to bring the adapter 20 into position to be bolted to the meter, it being assumed that the adapter of the proper size has been secured by bolts 21 to the ring 22 on the adjustable pipe 18. Column 35 will be adjusted by manipulating hand wheel 43 to bring the adapter 34 into position for connection to the discharge spud of the meter. Usually the connections are first shifted into approximately the position for connection to the meter to guide the operator in adjusting the platform of the truck. Next, the adapters 34 and 20 are bolted to the meter, and the parts will be in readiness for testing. By opening valve 16 and valve 70, the flow of fluid may be controlled through the discharge pipe 35 into tank 36, the discharge being weighed and measured in the tank, as well understood in the art. By manipulating the lever 72 into different positions, fractional flow tests may be made, different fractional flows for different sizes of meters being shown by the pointer 75 on the tables 76. For example, if a three-inch meter is being tested, the fractional flow permitted by the valve 70 will be indicated on the arcuate table 76 of indications 77 associated with meter size "3". All of the needle valves 81 will be normally closed and to make sensibility tests valve 70 will be closed and then these valves 81 are successively opened to permit a small flow of known volume to pass through the needle-valve. The result of the tests may be ascertained by measuring or weighing the fluid which has passed to the tank 36.

In practice, it has been found, particularly when making a sensibility test, which extends over a long period of time, that the operator, in attempting to do other work, will not be present at the proper time to close and note the record, and for the purpose of signalling the operator that the close of the test is approaching, an automatic signalling device is provided. This consists of an electric bell 90 or other suitable signal conveniently located which is operated by an electric circuit, including conductors 91 and 92, a battery 93 and a switch comprising a stationary contact 94 and a movable contact 95. The movable contact is adapted to be operated to close the circuit by a float 96 which is disposed in the tank 36 and secured to a rod 97 which is guided vertically in a bracket 98. Rod 97 extends upwardly above the tank and has a downwardly extending member 99 which is adjustably secured in a pipe or sleeve 100 which is guided vertically in lugs 101 and 102 and to the lower end of which the switch 95 is secured. A stop 103 normally rests on lug 102 to support the float and its operating connections in desired position, so that the float will be lifted by the rising water in the tank as the close of the test is approaching. A thumb-screw 104 in the sleeve 100 is adapted to secure the member 99 and the sleeve together, so that the float 96 will be positioned at the desired elevation according to the test being made. In operation, the float 96 will be set so that it will be operated a short time before the water in the tank 36 rises to the point when the test will be concluded and as a result, the float will, prior to the closing of the test, lift the rod 97 and sleeve 100 and the switch 95 will close the circuit for the signalling device 90, so that the operator will have time to come to the tester before the close of the test.

The invention thus exemplifies an improved meter tester which includes a single valve whereby fractional flow tests may be made with meters of different sizes; one in which a large meter can be handled by one man in making connection and disconnection to the tester; in which the discharge column may be quickly manipulated by gearing into position for connection to the meter; and in which a series of sensibility-test valves are provided and whereby an accurate test may be made.

The invention is not to be understood as restricted to the details set forth, since these may be modified within the scope of the appended claim, without departing from the spirit and scope of the invention.

Having thus described the invention, what I claim as new and desire to secure by Letters Patent, is:

A meter tester provided with a meter inlet connection which comprises telescopic pipes,—a ring slidable longitudinally on the outer of said pipes,—a rod connection between the inner pipe and said ring, and a lever for shifting said ring.

HORACE W. CLARK.